United States Patent [19]
Brach

[11] 4,240,604
[45] Dec. 23, 1980

[54] CLAMPING DEVICE AND ITS USE
[75] Inventor: Ulrich K. G. Brach, Zell, Fed. Rep. of Germany
[73] Assignee: Zeller-Plastik Koehn, Grabner & Co., Zell, Fed. Rep. of Germany
[21] Appl. No.: 6,722
[22] Filed: Jan. 26, 1979
[30] Foreign Application Priority Data Jun. 2, 1977 [DE] Fed. Rep. of Germany ....... 2724903

[51] Int. Cl.³ .............................................. F16L 3/08
[52] U.S. Cl. ............................ 248/316 D; 24/73 PB; 248/74 R
[58] Field of Search ............. 248/74 A, 74 PB, 74 B, 248/74 R, 226.2, 226.5, 316 A, 316 D, 113; 24/73 AP, 73 PB, 73 SA, 81 CC, 156 R, 257 R, 259 C, 255 C, 255 SL, 243 AC, 248 SL

[56] References Cited
U.S. PATENT DOCUMENTS

| 3,163,712 | 12/1964 | Cochran | 248/74 PB X |
|---|---|---|---|
| 3,627,300 | 12/1971 | Caveney | 24/257 R X |
| 3,637,177 | 1/1972 | Santucci | 248/74 PB |
| 3,807,675 | 4/1974 | Seckerson | 248/74 A X |
| 3,944,177 | 3/1976 | Yoda | 24/73 AP X |
| 3,954,238 | 5/1976 | Nivet | 248/74 PB X |
| 3,980,263 | 9/1976 | Okuda | 248/74 PB X |
| 3,991,960 | 11/1976 | Tanaka | 248/74 PB X |
| 4,023,758 | 5/1977 | Yoda | 248/74 PB X |
| 4,082,094 | 4/1978 | Dailey | 24/260 X |
| 4,157,856 | 6/1979 | Shevchuk | 24/73 PB X |

FOREIGN PATENT DOCUMENTS

| 2329563 | 1/1975 | Fed. Rep. of Germany | 248/74 A |
|---|---|---|---|
| 2442414 | 3/1976 | Fed. Rep. of Germany | 248/74 R |
| 1077821 | 8/1967 | United Kingdom | 24/73 AP |

Primary Examiner—J. Franklin Foss
Attorney, Agent, or Firm—Cushman, Darby & Cushman

[57] ABSTRACT

A holding device which serves as a multipurpose clamp in the household, in workshops etc., for the releasable holding of objects on walls, pieces of furniture and similar objects, as well as for holding of opened or closed doors. The holding device should be capable of being made from plastic, so it could be moved by a snapping process from the closed to the opened state and vice versa, and it should be developed such, that no phenomena of fatigue of the plastic material could occur, although considerable forces oppose a removal of the supported objects. For this purpose, the holding device has a bent or angular bending spring (10) and gripping parts (22, 26) which are interconnected by film-hinges (12, 13, 18) and, to be sure, in such a way that sections of the gripping parts, in the closing position, fit into the bending spring. See for this FIGS. 1 and 1a.

14 Claims, 15 Drawing Figures

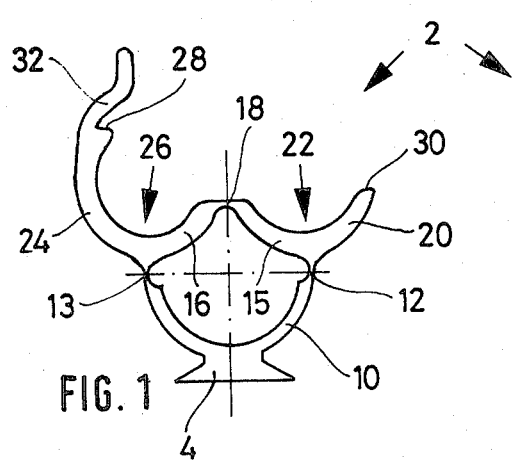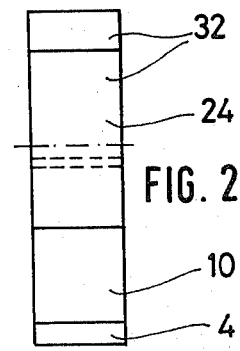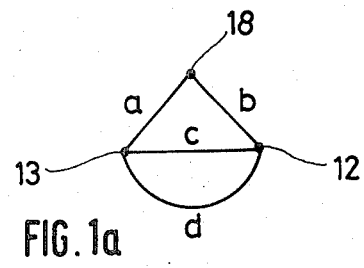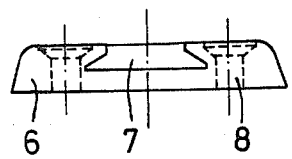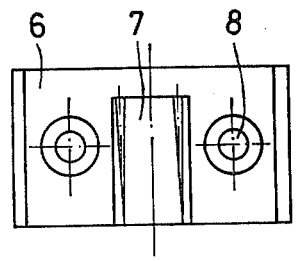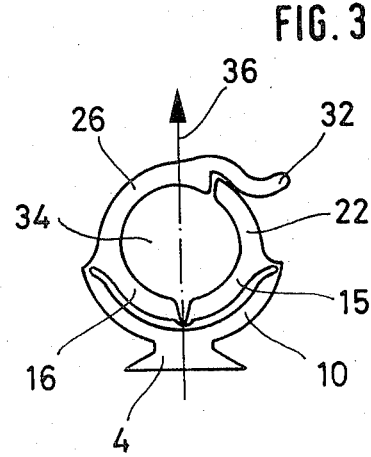

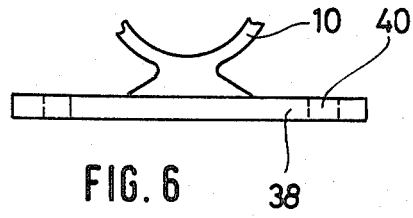
FIG. 6
FIG. 8
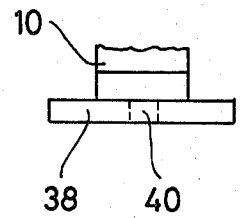
FIG. 7
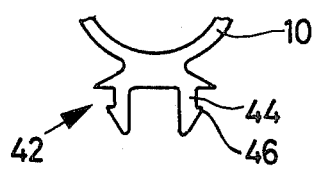
FIG. 9
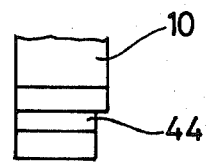
FIG. 10
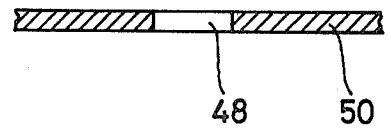
FIG. 11
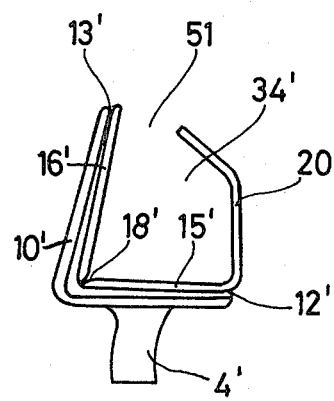
FIG. 12
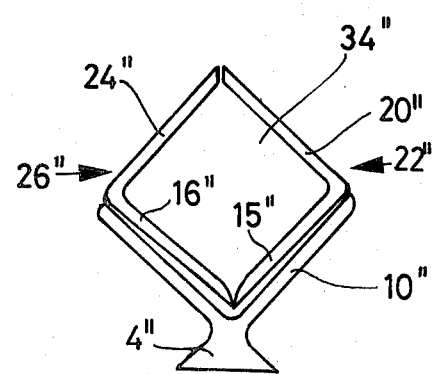

CLAMPING DEVICE AND ITS USE

FIELD OF APPLICATION

The holding device according to the invention is to be used as a multipurpose clamp in the household, in workshops or other places everywhere where objects are to be secured releasably in a simple manner and safely on the wall, on pieces of furniture or elsewhere. It replaces suspension hooks etc., and improves the holding function. In a special embodiment it may serve for keeping doors, windows etc., closed or open.

STATUS OF THE PRIOR ART

The definition of the species of claim 1 relates to a holding device, as known from the U.S. Pat. No. 3,292,223 of Esposito. There we are dealing with a laundry clamp which also has three film hinges and may be brought from the open to the closed position and vice versa, by a snapping process. In an embodiment as in FIG. 6 to 8 of Esposito, one of the gripping devices may be equipped with an eye, by means of which the latter and thus the entire clamp may be fastened to the longitudinal bar of a stirrup, which then results in a holding device for pieces of laundry. The pieces of laundry are then held in the closed state by elastic force. Such a development leads to phenomena of fatigue of the plastic material used, so that the holding device, after a while is no longer in a position to clamp down the pieces of laundry sufficiently firmly.

The spring device of the laundry clamp according to Esposito, essentially has the shape of a horseshoe, the curve of which is bridged by a crosspiece. Consequently, the actual spring action action may only be assumed by the legs beyond the crosspiece. The plastic material present is thus not used optimally, or particularly much material must be used for the achievement of an intended spring action.

In a different kind of field, namely the construction of hinges, a spring-cushioned hinge made of plastic with three joint grooves or film-hinges has already become known through German AS No. 18 17 814 which has a similar snapping action. This hinge however, is not suitable, to enclose a gripping space, and therefore may not be used for holding an object with cocked spring solely by form-lock.

TASK, SOLUTION, ADVANTAGES

The following invention is to create a holding device, which may be attached to any object with the help of its fastening part, and which encloses a gripping space in a form-closed manner, which serves for the holding of any object. The holding device is to be equipped with a snap-clamp which in the closed state as well as in the open state is normally slack, so that no fatigue phenomena of the plastic material may occur. As the result of a particularly favorable development of the components of the snap-clamp, the spring force is to rise very steeply during moving out of the closed as well as of the opened position, the consequence of which is that the snap-clamp may only be moved from one into the other position with the exertion of considerable forces, and consequently securely holds an object in the closed position. Also, the force needed in order to move the snap-clamp out of its opened position should be of considerable magnitude, so that the clamp will securely remain in its opened position, in order that objects to be held may be forced in a simple manner into the clamp, therefore that no other manipulation would be required.

All this is going to be achieved simultaneously by the invention according to claim 1.

A relatively large gripping space is created by the two control levers fitting into the open side of the bending spring. The steep rise in power, upon leaving the closing and the opening positions will be achieved by the sum of the spaces between the middle and the two outside film hinges being only slightly smaller then the unwound length of the bending spring. As a consequence of this measure it follows that, as compared to Esposito, one will get along with a fraction of the material for holding of an object of a certain size and that one, moreover, achieves a steeper rise of the opening force.

The holding device of the invention hold objects more securely than previously known holding devices, since it forms a closed loop in its closed state. Just the same, the object held may be removed easily. It holds objects securely even in case of shocks, for example, in vehicles.

In order to attach an object, the object itself may be pressed into the opened clamp in a simple manner, so that as a result of that it will snap into its closing position. For removal of the object, it will only be necessary to pull it out of the holding device while opening the snap-clamp. In other cases of application it will be more effective to close and to open the snap-clamp by hand, while the object that is to be fastened or removed is held with the other hand.

DEVELOPMENTS OF THE INVENTION

The condition that the control levers must fit into the open side of the bending spring may be fulfilled with a multiplicity of forms of the control levers and of the spring. For example, the levers may have unequal lengths, even though one embodiment with equal lengths is more important. In a further development of the invention the spring may be angular and the control levers straight. In this way one will obtain a gripping space of rectangular, rhomboid or square cross section, which is suitable for accomodating of objects of corresponding cross sectional shape.

On the other hand, the bending spring and the control levers, or the grippers in their cross section may be given the form of elliptic arcs, on the outside of circular arcs, as a result of which one will obtain a gripping space with elliptic or circular cross section. Such holding devices are suitable for the attachment of the multiplicity of objects with round parts, such as cooking spoons, screw drivers, round files, keys as well as objects with elongated cross section, such as tooth brushes, half round files, part of a set of silver, etc.

While a closing of the holding device by lateral pressure with two fingers is easily possible, the opening is made more easy by a further development of the invention as in claim 6.

While the fastening part in case of the Esposito claim is disposed inside a gripper and thereby restricts the gripping space and leads to the fact that the object to be clamped down may be held only at spring tension, in a further development of the invention as in claim 7, the fastening part is attached at another place of the snap-clamp, namely on the outside of the spiral spring, or of one of the control extensions, whereby the attachment on the outside of the bending spring is particularly significant.

Whenever the attaching part has the shape of a plate then the holding device may be screwed on or glued on there.

In a further development of the invention as in claim 10 the attaching part may also be developed multipartly, namely a separate plate, which may be screwed-on or glued-on by itself and which may be united with the snap-clamp by way of a dovetail joint. As a result of that, the attachment of the plate is made more easy and a possibility is created of attaching a snap-clamp alternatingly to one of several plates at different places merely by changing the dovetail.

In a further development of the invention as in claim 11, the fastening part may be developed as an extension in the form of a socket with stops. The snap-clamp may then be attached or changed for example, in an orifice plate anywhere.

The holding device may be produced in very different sizes, for example, for holding of small objects such as pencils, but also for holding of relatively large objects.

According to a further development of the invention, as in claim 12, the holding device contains, beside the snap-clamp with its attaching part a filler element, fitting into the gripping space, which on its part is provided with a fastening mechanism. This opens up a multiplicity of additional cases of application, thus for example, the holding open of doors, also doors of cabinets, windows etc. For example, the snap-clamp is attached to a door, as far away from its axis as possible, and the filler on the floor, a wall etc. Whenever the door is closed, the snap-clamp is open. Whenever the door with its snap-clamp is moved toward the locally fixed fairing, then the clamp closes around the fairing. Whenever the door is to be closed again, some force has to be expended in order to tear open the snap-clamp, which however, is of no consequence in case of the standard closing process of the door.

Snap-clamps with filler may also be used for example for suspending of fairly large objects, such as boards or pictures on a wall. For example, two to four holding devices of this type may be used. In case of pictures, the often desirable distance from the wall will be achieved thereby, especially only on the top-side of the picture, and a covered up attachment of the fastening means.

Furthermore the invention is to extend to two special types of application, which do not simply result from the clamp inself and for which protection is claimed within the scope of claims 13 and 14.

The type of application as in claim 13, relates to the laying of pipes and cables. The holding devices may first of all be attached independently of the cable, and the cable need only be inserted subsequently. Beyond that, the cable may be removed anytime by opening the snap-clamps, may be replaced by another cable, etc., which in case of the presently customary bipartite cable duct clips is either not, or at least not as easily possible.

In a further development according to the invention, as in claim 14, the holding device may be used for the suspension of textiles, for which normally a suspender is needed, for example, in case of towels, pot holders, shirts or for pieces of clothing a hanger. Whenever a holding device according to the invention is attached to the wall, preferably in such a way that the axis of its gripping space runs vertically, then any part of a towel, of a pot holder or piece of clothing may simply be pressed into the open clamp, whereby the snap-clamp encloses a part of the cloth and holds it fast. In order to remove it, one merely needs to pull the piece of textile, so that the snap-clamp opens, releases it and is ready for retake. Above all, the annoying search for the suspender of a piece of textile is eliminated. One may altogether omit any suspender.

In this way it is also possible to attach the edges for example, of curtains to a wall.

Embodiments of the invention are described subsequently on the basis of the drawing:

FIGS. 1 and 2 show a holding device according to a first embodiment of the invention in front view or sideview. FIG. 1a is a basic presentation of the lengths of the holding device essential for functioning.

FIG. 3 shows in front view the holding device as in FIG. 1 in closing position.

FIGS. 4 and 5 show in side view of plan view a pertinent base plate.

FIGS. 6 and to 9 show attaching projections of a different kind, always in two sideviews.

FIG. 10 shows a piece of a punched plate in cut.

FIGS. 11 and 12 show in front view two other embodiments of holding devices.

Figure 13:
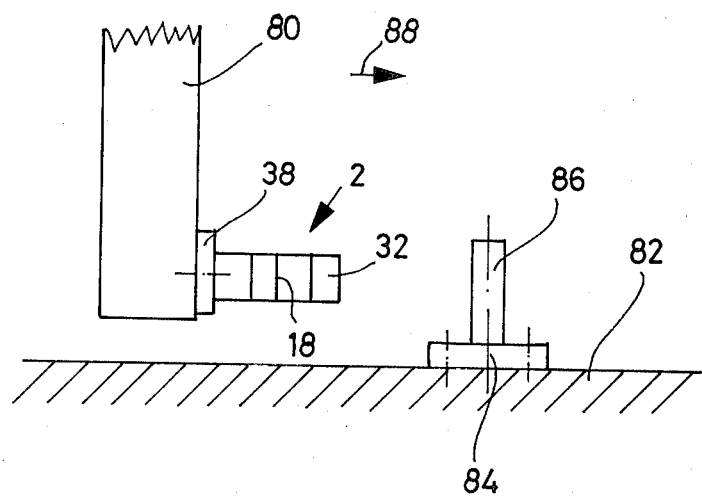
Figure 14:
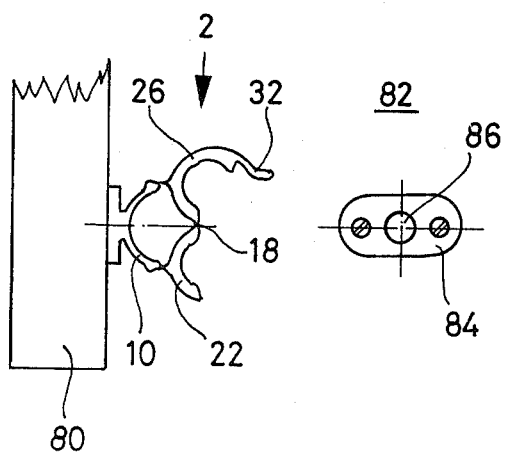

FIGS. 13 and 14 show in sideview or top view a holding device with fairing for holding open of double doors or similar objects.

BEST WAY TO CARRY OUT THE INVENTION

The holding device as in FIGS. 1 to 5 consists of a snap-clamp designated as a whole by 2, with a fastening extension 4 in the form of a swallow tail foot, as well as a foot plate 6 with fastening orifices 9 and a swallow tail groove 8, into which the swallow tail foot may be inserted.

The snap-clamp 2 is extruded in one piece of polypropylene and has a continously uniform cross sectional form. The snap-clamp has a bending spring 10 which in its cross section is approximately semicircular and which carries the fastenin extension 4. The bending spring 10 terminates in two film-hinges 12 and 13, by which it is connected in one piece with two control levers 15 or 16. These control levers are interconnected by another film-hinge 18. Only the parts between film-hinges 12 and 18 or 13 and 18 are designated as control levers 15, 16 in this case. The control lever 15 has an extension 20. Together with this, it forms a gripper 22 which in its cross section is circular. The control lever 16 has an extension 24 together with which it likewise forms a circular gripper 26. The extension 24 terminates in a stop 28 for the end 30 of the extension 20. The extension 24 is lengthened by a handle extension 32 which may be used for opening of the snap-clamp.

In the closing state, the two grippers 22 and 26 surround the gripping space 34 (FIG. 3). The gripper 22 extends along an arc of less than 180° and the gripper 26 along an arc of more than 180°.

Whenever the snap-clamp 2 is to clasp an object, which fits with its point of contact into the gripping space 34, then the object is pressed axis-parallel against the film hinge 18, so that the two control levers 15 and 16 are pressed against the bending spring 10. The latter expands, until finally its largest width and thus the dead center of the snap-clamp has been reached. After that, the bending spring forces the two control levers 15, 16 and thus the grippers 22, 26 into the closing position as in FIG. 3, in which the object is clasped. In order to open it, the object may simply be torn out of the snap-clamp, and to be sure, in the direction of arrow 26 in FIG. 3, as a result of which the snap-clamp again snaps back into the "open" position as in FIG. 1. Instead of that the snap-clamp may be opened on the grip extension 32 and the object may be removed.

From FIG. 3 one may recognize that the control levers 15, 16 in closing position fit well into the bending spring 10. FIG. 1a shows schematically the lengths between the film-hinges 12, 13 and 18, essential for the functioning. The lengths a, b and c correspond to the straight line connecting lines between the film-hinges, and the arc d corresponds to the length of the bending spring 10. The diagrammatic presentation of FIG. 1a is valid however, analogously for all other embodiments of snap-clamps, which are dealt with subsequently.

The first condition for a snap-effect that counts lies in the fact that the sum of the lines a and b is greater, if possible considerably greater than line c. In that case the bending spring must indeed be bent up by a considerable bit in order to overcome the dead center.

Beyond that the invention teaches, that both control levers 15, 16 should fit as well as possible into the open side of the bending spring 10. this will be the case, whenever the sum of the lines a and b is the least bit smaller than the length d of the arc.

As FIGS. 6 and 7 show, the snap-clamp may be extruded in one piece with a fastening extension 38 in the form of a foot plate. The foot plate may be coated with some self-adhesive material and may be put on the market, provided with a cover foil. Instead of that, the foot plate may also have fastening orifices 40.

ADDITIONAL EMBODIMENTS OF THE INVENTION

FIGS. 8 and 9 show a fastening extension 42 which is likewise extruded in one piece with the snap-clamp and which has two plug pins 44 with stop projections 46, pointing outward. With this the snap-clamp may be attached by plugging into a rectangular orifice 48 of a plate 50, whereby the stop projections 46 hold the snap-clamp securely. Thus snap-clamps may be attached in this way in strips with a series of orifices 48, or in plates, which have such orifices over their entire surface, so that they may be fastened quickly or else re-plugged, in order to attach any kind of tools, household articles, toilet articles or others thereon.

The snap-clamp may also have other forms, than the ones shown in FIGS. 1 to 3. Thus, FIG. 11 shows a bending spring 10' which is not arc-shaped but angular. The fastening extension 4' does not start at the apex of the bending spring but on one of its arms. Both arms are of different lengths. Correspondingly, the control levers 15' and 16' are of different lengths, which however, are selected such, that the control levers fit well into the angle of the bending spring. Only one of the control levers, namely 15', has an extension 20', which alone is sufficient to hold an object in a formfitting manner in the closing condition. There remains a gap 51, which will be effective whenever a part of the object to be held is to project out of the clamp, f. ex. whenever textiles are to be held, but the bending spring 10' in its closing position is not to be under stress or by only under very slight stress. Whenever the gap 50 is not desired, then the extension 20' may be lengthed and an extension may be attached to the control lever 16'. The fitting-in and the other two, above mentioned conditions are fulfilled here too.

FIG. 12 shows a snap-clamp, the gripping space 34" of which has a square cross section. The arms of the bending spring 20", consequently enclose about a right angle. Likewise, the extensions 20" and 24" form right angles with the control levers 15" and 16". Snap-clamps of this type are particularly well suited for holding objects with a square cross section or for the fastening to pipes or bars of square cross section.

Instead of the forms shown, the snap-clamps may be developed such, that they encircle gripping spaces of elliptic, rectangular or orthorhombic cross section.

FIGS. 13 and 14 show the use of a holding device as in FIGS. 1 and 3, but with a fastening attachment 38 in the form of a foot plate as in FIGS. 6 and 7, for holding the wing of a door 80 in its open position. The snap-clamp 2 is screwed to the lower end of the door wings 80 with the help of its fastening attachment 38. The direction of view in FIGS. 18 and 19 is in the direction of the plane of the door. A filler 86 in the form of a cylindrical peg is screwed onto the floor 82 with the help of the fastening plate 83. In the position shown, the snap clamp 2 is opened. Whenever the wing of the door is moved in the direction of the arrow 88, then the snap-clamp finally presses with its film-hinge 18 against the fairing 86, encircles the latter and holds the wing of the door open. In order to remove the door from the filler 86 it merely needs to be moved away with some force, as a result of which the snap-clamp 2 opens. It is recommended to use a snap-clamp with a gripper extension 32, so it may be opened by hand, if it just happended to have been closed inadvertently, away from the filler 86.

I claim:

1. Holding device which has a snap-clamp provided with a fastening part, produced in one piece from plastic, especially from polypropylene, whereby the snap-clamp has a bending spring mechanism with two mutually resilient legs (spring legs) and two interconnected control levers, connected with the ends of the spring legs always by a film-hinge, and at least one of the control levers has an extension, which together with a control lever forms a gripper for an object to be held, and whereby the sum of the distances between the middle and the two outside film-hinges in case of a relaxed spring mechanism is greater than the distance between the two outside film-hinges, characterized in that the spring mechanism is a curved or angular bending spring (10, 10' etc.), and in that the control levers (15, 16 etc.) fit into the open side of the bending spring in such a way that the sum (a+b) of the distances between the middle (18) and the two outside film-hinges (12, 13) is only a little smaller than the uncoiled length (d) of the bending spring (10 etc.).

2. Holding device as in claim 1, characterized in that the bending springs (10'; 10") are angular and the control levers (15' 16'; 15", 16") are straight (FIG. 12).

3. Holding device as in claim 2, characterized in that both grippers (22", 26") and a control lever (16") and a gripper (22") together enclose in their closed position a gripping space (34") of square, rectangular or rhombic cross section (FIG. 12).

4. Holding device as in claim 1, characterized in that in a cross section through the film-hinges (12, 13, 18), the bending spring (10) and the control levers (15, 16) have the shape of circular arcs or elliptical arcs (FIGS. 1 and 3).

5. Holding device as in claim 4, characterized in that the grippers (22, 26) together, or a control lever (15) and a gripping (26) together, enclose a gripping space (34) of elliptical or circular cross section, in their closing state (FIG. 3).

6. Holding device as in one of the preceding claims, characterized in that at least one of the grippers (26) has a gripping extension 32, which in the closing position lies outside the free end of the other gripper (22), (FIG. 1).

7. Holding device as in one of the preceding claims, characterized in that the fastening part is an extension (4; 38; 42; 4'; 4") provided on the bending spring or one of the extensions, (FIGS. 1, 6, 8, 11, 12).

8. Holding device as in claim 6, characterized in that the fastening extension (38; 52) is a plate (FIG. 6).

9. Holding device as in claim 8, characterized in that the plate (38) is coated with a self adhering agent on the side facing away from the holding device.

10. Holding device as in claim 7, characterized in that the fastening extension is a swallow tail foot which fits into a shallow tail groove (8) of a separate fastening plate (6), (FIGS. 1 to 5).

11. Holding device as in claim 7, characterized in that the fastening extension (42) is a plug-foot with stops (46), (FIG. 8).

12. Holding device as in one of the claims 1 to 6, characterized in that it has a separated fairing (86) fitted into the gripping space (34) of the snap-clamp (2), which fairing is provided with a fastening mechanism (84), (FIGS. 13, 14).

13. Using of a holding device as in one of the claims 1 to 11 for the laying of cables, wires and pipes.

14. Use of a holding device as in one of the claims 1 to 11, for supporting of objects made of textile materials (fabrics).

* * * * *

UNITED STATES PATENT AND TRADEMARK OFFICE
CERTIFICATE OF CORRECTION

PATENT NO. : 4,240,604
DATED : December 23, 1980
INVENTOR(S) : Ulrich K.G. BRACH It is certified that error appears in the above—identified patent and that said Letters Patent is hereby corrected as shown below:

In the Heading:

Item [22] read "Filed: Jan. 26, 1979" as

--PCT Filed: June 1, 1978

Add: [86] PCT No.: PCT/EP78/00001
§371 Date: Jan. 26, 1979
§102(e) Date: Jan. 26, 1979

[87] PCT Pub. No.: WO 78/00003
PCT Pub. Date: Dec. 7, 1978

Signed and Sealed this

Twenty-third Day of February 1982

[SEAL]

Attest:

GERALD J. MOSSINGHOFF

Attesting Officer  Commissioner of Patents and Trademarks